United States Patent [19]

Sarkkinen

[11] Patent Number: 4,488,907

[45] Date of Patent: Dec. 18, 1984

[54] PROCESS FOR THE PREPARATION OF LIGNOSULFONATE-BASED MIXTURES USED IN PARTICULAR AS ADDITIVES OF CONCRETE

[75] Inventor: Veli Sarkkinen, Pori, Finland

[73] Assignee: Flowcon Oy, Toijala, Finland

[21] Appl. No.: 538,909

[22] Filed: Oct. 4, 1983

[30] Foreign Application Priority Data

Oct. 8, 1982 [FI] Finland .................................. 823441

[51] Int. Cl.³ .............................. C07G 1/00; C04B 9/02
[52] U.S. Cl. .................................................. 106/14.11; 106/315; 106/123.1; 530/500
[58] Field of Search ....................... 106/14.11, 123, 315; 260/124 R; 210/729

[56] References Cited

U.S. PATENT DOCUMENTS 3,297,676 1/1967 Brauns et al. .................. 260/124 R
3,776,897 12/1973 Ikari et al. ...................... 260/124 R
4,336,189 6/1982 Hämälä et al. .................. 260/124 R
4,450,106 5/1984 Forss ................................... 260/124

*Primary Examiner*—Theodore Morris
*Attorney, Agent, or Firm*—Finnegan, Henderson, Farabow, Garrett & Dunner

[57] ABSTRACT

The present publication describes a process for the preparation of lignosulfonate-based mixtures used in particular as additives of concrete. According to the process of the present invention, the sulfite spent liquor is treated with a nitrating reagent, such as nitric acid or nitrogen dioxide, and the reacted lignosulfonate is separated from the reaction product, and, together with the reacted lignosulfonate, the nitrate and nitrite compounds are separated from the reaction product, and the product mixture formed by the reacted lignosulfonate, nitrate compounds and nitrite compounds is purified in a way known per se. The product prepared in accordance with the process is suitable in particular for the liquefaction of concrete, for accelerating the setting of concrete, and for inhibiting corrosion of concrete reinforcement steels contained in concrete, if any.

6 Claims, 2 Drawing Figures

PROCESS FOR THE PREPARATION OF LIGNOSULFONATE-BASED MIXTURES USED IN PARTICULAR AS ADDITIVES OF CONCRETE

The present invention is concerned with a process for the preparation of lignosulfonate-based mixtures of additives from sulfite spent liquor suitable for the liquefaction of concrete, for accelerating the setting of concrete, and for inhibiting corrosion of concrete reinforcement steel contained in concrete.

The process comprises the treatment of the sulfite spent liquor derived from the cooking of a cellulose-containing substance with a nitrating reagent as well as the separation of the reacted lignosulfonate in this way obtained out of the reaction product.

As is well known, various additives are used in the production of concrete and concrete products, the said additives being supposed to facilitate the preparation and the casting of the concrete and to accelerate the setting of concrete, on one hand, and, also, to improve the quality of concrete, on the other hand.

On the basis of their main features, these agents can be divided into three different groups of agents:

1. Liquefiers

The objective of these agents is to reduce the quantity of water in the concrete mix, with a simultaneous improvement in the consistency. Thereat, it is also possible to reduce the quantity of cement in the concrete mix without deterioration of the strength, whereat economies of material are achieved which improve the economy of the construction work. In such a case, the liquefier must be of sufficiently low cost. As liquefiers are used, e.g., sulfonated melamine compounds etc. surface-active agents.

2. Accelerators

These are used in order to accelerate the setting of concrete. Such agents are, e.g., calcium chloride, calcium formate, calcium nitrite, salts of gluconic acid, as well as alkalis.

3. Corrosion inhibitors

These are intended for use in constructions in which a corrosion protection of the concrete reinforcement steel improves the strength of the structure essentially and reduces the weight of the structure. Corrosion protection is particularly important in a chloride-containing environment, such as in structures placed in the sea water (structures that are subjected to the effect of the sea water). Corrosion inhibitors are, e.g., nitrites, zinc compounds, and amines.

If one wishes to use all of these agents in order to achieve an optimum concreting result, the share of the concrete additives in the cost becomes disproportionately high, because concrete in itself is an inexpensive mass product, whereat the use of additives becomes unprofitable.

Thus, it would be desirable to obtain one single product that has, at the same time, the effects of both liquefaction, acceleration and corrosion inhibition.

As is known in prior art, lignosulfonates are used as concrete additives. For example, in U.S. Pat. No. 4,336,189 a process is suggested by means of which lignosulfonates and lignosulfonic acids suitable for such a purpose can be separated from spent liquor resulting from the cooking of cellulose.

It is also known in the prior art that the surface properties of lignosulfonates can be modified by means of nitration. Chudakov et al. have described the nitration of the residual liquor of sulfite alcohol fermentation by means of nitric acid (Izv. VUZ, Leisnoi Zh. 20 (1977) No. 6, pp. 125–127, ref. A.B.I.P.C. 49 (1979) No. 8, 6642). It was ascertained that this treatment causes nitration and partial oxydation of lignosulfonates. It was noticed that the nitro-lignosulfonate isolated as the product had good surface-active properties, and its use as an additive for paper was suggested.

However, by means of these processes, it is not possible to prepare such additives of concrete that possess all of the three properties mentioned above at the same time.

The object of the present invention is to provide a lignosulfonate-based mixture of additive for concrete of an entirely novel type, which mixture has simultaneously the effects of both liquefaction, acceleration and corrosion inhibition.

It has been noticed that on nitration of the spent liquor from sulfite cooking, not only nitration and partial oxydation of lignosulfonates take place, but also their partial desulfonation as well as reduction of nitrate ions to nitrite ions. Thus, the present invention is based thereon that, by separating the nitrate and nitrite ions out of the reaction product together with the lignosulfonates, a product mixture is surprisingly obtained, wherein the nitro-lignosulfonate has improved liquefaction properties owing to the oxydation of LSA, nitro-lignosulfonate acts in an alkaline environment as an efficient corrosion inhibitor together with nitrite, thereby protecting the concrete reinforcement steel from corrosion, and the nitrate and nitrite produced in the solution act as accelerators and accelerate the setting of concrete.

The lignosulfonate used as a liquefying agent must be free from sugars, because sugars have an effect of retarding the setting of concrete. Lignosulfonate free from sugars can be prepared, e.g., by ultrafiltration, whereat a product of a relatively low content of sugars is obtained, or by extraction, e.g. in accordance with the U.S. Pat. No. 4,336,189 whereat almost 100% pure lignosulfonate is obtained.

The process of ultrafiltration involves the drawback that the necessary equipment is expensive and an abundance of waste is produced in the process, which waste restricts the use of the process in large units.

Now it has been noticed that a nitration performed in accordance with the present invention simplifies the desugaring of the product essentially. When the said sulfite spent liquor is being nitrated, the sugars contained therein are oxydated by a joint effect of $NO_2$ and $HNO_3$ to organic mono- and di-carboxylic acids, out of which in particular the latter ones are precipitated as calcium salts when the pH is raised.

Thus, the process in accordance with the invention combines the nitration of the spent liquor, the separation of the sugars and the organic carboxylic acids formed out of the sugars from the reaction mixture such that the lignosulfonate compounds and any unreacted nitration reagent as well as the nitrite compounds may form one and the same product.

By means of the process in accordance with the invention, remarkable advantages are achieved. Thus, by means of one inexpensive process step, it is now possible to prepare a concrete additive that possesses all of the three important properties mentioned above at the beginning. The sugar content of the product is low, whereat the liquefying property of the nitro-lignosulfonate is very good. Also, the accelerating effect of nitrate and nitrite is excellent. It has been established that the corrosion of the concrete reinforcement steels is reduced even down to 10%. In carrying out this process, no expensive ultrafiltration equipment is needed for desugaring. In spite of this, the raw-material does not have to be purified in advance, but the spent liquors of several different sulfite processes can be used directly as raw-material for the process, because of which the process in accordance with the present invention can be readily connected to many currently operating processes without high investment cost.

The invention will be examined below in more detail with the aid of the attached drawings.

FIG. 1 shows a preferred embodiment of the process in accordance with the invention.

The spent liquor from sulfite or bisulfite cooking, which contains lignosulfonates as well as sugars obtained from hydrolyzation of cellulose, is supplied into a reaction vessel. Concentrated nitric acid is added slowly to the solution, or $NO_2$-containing gas is passed into the solution. When the spent liquor reacts with the nitrate ions, nitration of the lignosulfonates into nitro-lignosulfonates occurs, as well as their partial oxydation and desulfonation. At the same time, the nitrate ions split the sugars into corresponding mono- and di-carboxylic acids, and are themselves partly reduced to nitrites. Hereupon, the desired products are separated from the reaction solution by extracting with a liquid or solid ion exchanger.

Figure 1:
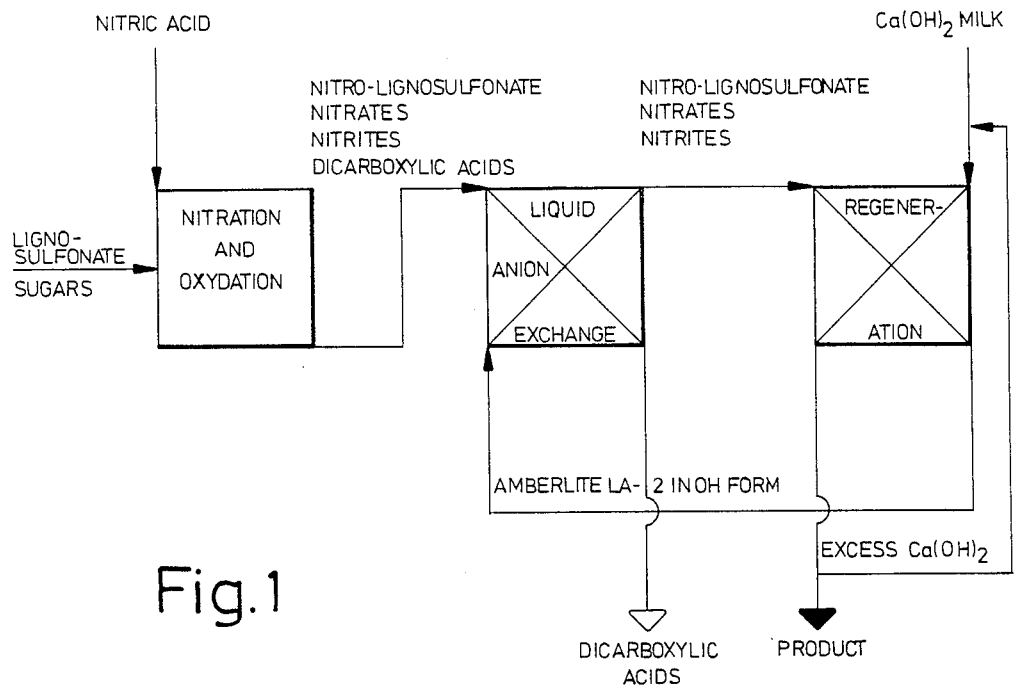
FIGS. 1 and 2 show flow diagrams of two alternative embodiments of the process in accordance with the invention.

FIG. 1 shows the performance of the process by using liquid anion exchange. As the extracting agent, the liquid anion exchanger, it is possible to use a secondary amine, e.g. Amberlite LA-2, in an appropriate solvent, such as hexane.

On extraction, the lignosulfonates as well as the nitrates and nitrites pass into the organic phase, whereas the organic carboxylic acids pass into the water phase. The organic phase is separated and treated with an appropriate base, such as $Ca(OH)_2$, for bringing the components extracted in it to the water phase. By means of the same treatment, the secondary amine to be used is regenerated and can be passed back to the extraction. Any excess of $Ca(OH)_2$ is separated by filtration, and the solution obtained can be used as an additive for concrete.

Figure 2:
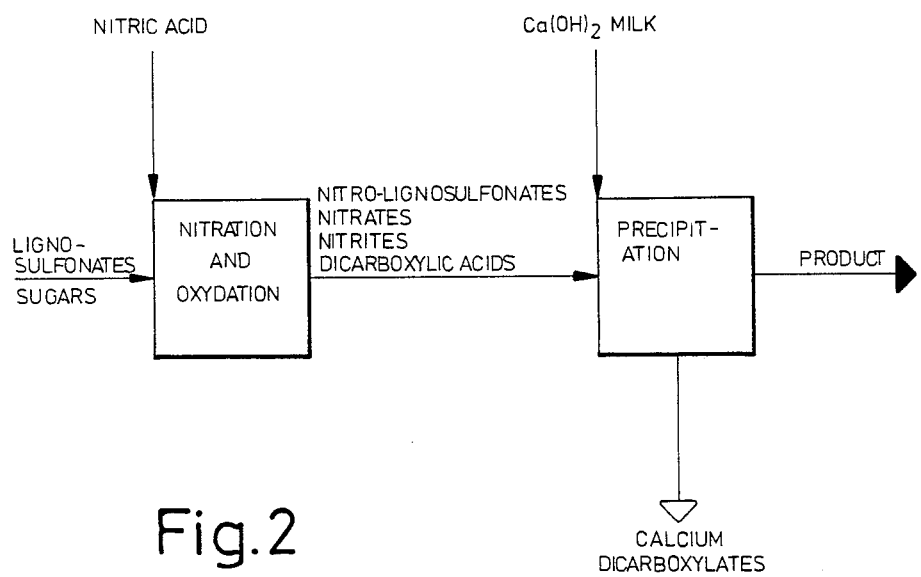

FIG. 2 shows a simplified embodiment of the process, by means of which it is possible to prepare additive mixtures well suitable for additive of concrete, the properties of these said mixtures being, however, not exactly of the same quality as those of the mixtures prepared in accordance with the embodiment described above. In this embodiment (of FIG. 2) the nitration is performed as described above, but the reaction solution is not extracted, but, in stead, CaO or $Ca(OH)_2$ is added to it so as to raise the pH-value of the solution and to precipitate the carboxylic acids as calcium salts. The precipitate produced is filtered, whereupon the solution obtained can be used as an additive for concrete.

By means of this embodiment, it is not possible to remove all sugars from the solution completely, because of which the liquefying properties of this mixture are not equal to those of the above.

The following examples give a closer description of the product in accordance with the present invention, of its preparation, and of its use.

EXAMPLE 1

Spent liquor obtained from the calcium bisulfite cooking of wood, whose composition was:
lignosulfonates: 160 g/l
sugars: 21 g/l
Ca: 20 g/l,
was taken as a quantity of 1 liter. 80 ml of concentrated nitric acid were added to the solution slowly during about 1 hour. During the addition, the temperature of the solution rose somewhat (from 20° C. to 50° C.). After the addition, the solution was stirred for another 15 minutes. Hereupon the solution was extracted with 1 liter of Amberlite LA-2 (50% mixture in hexane). The time of stirring during the extraction was 10 minutes. After the extraction, the solutions were allowed to be separated, and the organic phase was separated from the water phase in a separating funnel. The organic phase was now treated with milk of lime so as to bring the lignosulfonates, nitrates, and nitrites extracted therein into the water phase, any excess lime was separated, and the solution obtained was used for tests with additives.

Out of the product, the nitrogen content of the lignosulfonate was analyzed, being 0.58%. The sugar content of the solution in the extracted product was 0.08 g/l.

EXAMPLE 2

5 Liters of the solution in accordance with example 1 were placed into a glass vessel of a volume of 10 liters and a height of 80 cm, and gas containing nitrogen dioxide was passed into the glass vessel through a filter placed in the bottom. The quantity of gas was 4.8 m³, and the $NO_2$ quantity contained therein was 400 grams.

The gas was kept in the solution for 4 hours. Hereupon the solution was extracted in the way described above, and the product was analyzed and used for tests with concrete additives.

EXAMPLE 3

The nitration was performed in the way described in example 1, but the product was not separated from the reaction by-products, and it was used as such as additive for concrete.

EXAMPLE 4

After addition of nitric acid in accordance with example 1, the solution was heated to 80° C. and kept at this temperature for 1.5 hours. The pH of the solution was raised by means of CaO, and the precipitate produced was filtered and dried. The quantity of precipitated Ca-salts was 24 g.

The sugar content of the product solution was 3 g/l, having been 21 g/l at the beginning.

EXAMPLE 5

The solution in accordance with example 1 was treated by means of extraction purification as follows (FI Patent 60,873): The solution was extracted with 20-% Amberlite-LA-2-bisulfite, and the organic phase obtained was stripped with NaOH solution. Thereby, lignosulfonate completely free from sugars was obtained.

EXAMPLE 6

A nitrated pure lignosulfonate product was prepared by treating the lignosulfonate obtained from the preceding example with nitric acid in accordance with example 3.

EXAMPLE 7

The nitration as per example 3 was performed by using ultrafiltered lignosulfonate as starting material.

EXAMPLE 8

1 Liter of the spent liquor from calcium bisulfite cooking was nitrated as in example 1.

On completion of the reaction, the reaction mixture was allowed to flow through an ion-exchange column. The column contained 3 liters of anion-exchange resin Amberlite IRA-400 in the $OH^-$ form.

The resin was hereupon washed with $2 \times 2$ liters of water so as to remove impurities contained in the mother liquor.

Hereupon, the anion exchanger was eluted with milk of lime, and any excessive, unreacted lime was separated. The product was used for concrete tests.

The suitability of the products for additive of concrete was tested:

1. Accelerating and liquefying effect

Concrete was prepared by using 380 kg/m$^3$ of Portland cement. The quantity of additive used was 3% of the quantity of the binding agent. In order to express the liquefying effect, all the batches were brought to the same consistency by addition of water, and the liquefying effect is expressed as the reduction in the quantity of water to be used per cubic meter of concrete.

The accelerating effect was studied by making cubes of $20 \times 20 \times 20$ cm$^3$ out of the concrete mixes and by measuring their compression strength after setting (6 h/50° C. and 3 days/20° C.).

2. Effect of corrosion inhibition

This effect was studied by preparing concrete cubes of $20 \times 20 \times 20$ cm$^3$, into each of which cubes 2 pieces of about 10 cm long rods of concrete steel were inserted. The cubes were wetted after setting with a 1-% NaCl-solution daily for 6 months, whereupon the cubes were crushed, the steel rods were brushed clean and weighed.

The corrosion inhibition effect is expressed as a percentage of reduction in the weights of the concrete steel rods.

In the following table, the results of the tests with concrete additives are given:

| PRODUCT Example | Liquefying effect ($-\Delta$ H$_2$O/m$^3$ concrete) | Accelerating effect (Strength MN) 6 h/50° C. | Accelerating effect (Strength MN) 3 d/20° C. | Corrosion inhibit. effect ($-\Delta$ m/6 mo/%) |
|---|---|---|---|---|
| 1 | 45 1 | 12 | 26 | 0.1 (very good) |
| 2 | 42 1 | 9 | 24 | 0.1 (very good) |
| 3 | 20 1 | 0 | 18 | 0.1 (very good) |
| 4 | 25 1 | 6 | 18 | 0.1 (very good) |
| 5 | 42 1 | 4 | 12 | 1 (poor) |
| 6 | 45 1 | 12 | 25 | 0.1 (very good) |
| 7 | 42 1 | 10 | 22 | 0.1 (very good) |
| 8 | 43 1 | 11 | 25 | 0.1 (very good) |
| Prior art liquefier/accelerator | 44 1 | 12 | 25 | 1 (poor) |

What is claimed is:

1. A Process for the preparation of sugar-free lignosulfonate-based mixtures as additives for the liquefaction of concrete, for accelerating the setting of concrete, and for inhibiting corrosion of concrete reinforcement steels contained in concrete from sulfite spent liquor which contains lignosulfonate and sugars derived from the hydrolyzation of cellulose comprising treating the sulfite spent liquor with a nitrating reagent selected from the group consisting of nitric acid and nitrogen dioxide, whereby nitrolignosulfonates and nitrite compounds are formed, and separating only the sugars and the organic carboxylic acids formed out of the sugars in connection with the nitration from the reaction mixture, whereby the nitrated and partly oxydated and desulfonated lignosulfonate compounds and any unreacted nitrating reagent as well as the nitrite compounds form the additive for concrete.

2. The process of claim 1, wherein the separation of said sugars and organic carboxylic acids from the reaction mixture is carried out by means of anion exchange.

3. The process of claim 2, wherein a liquid anion exchanger is used.

4. The process of claim 2, wherein a solid anion exchanger is used.

5. The process of claim 1, wherein said sugars and organic carboxylic acids are separated from the reaction mixture by adding CaO to the reaction mixture and precipitating them as poorly soluble calcium salts.

6. The process of claim 1, wherein said sugars and organic carboxylic acids are separated from the reaction mixture by adding Ca(OH)$_2$ to the reaction mixture and precipitating them as poorly soluble calcium salts.

* * * * *